V. BENDIX.
ENGINE STARTER.
APPLICATION FILED OCT. 12, 1916.
1,308,752.
Patented July 8, 1919.
2 SHEETS—SHEET 1.
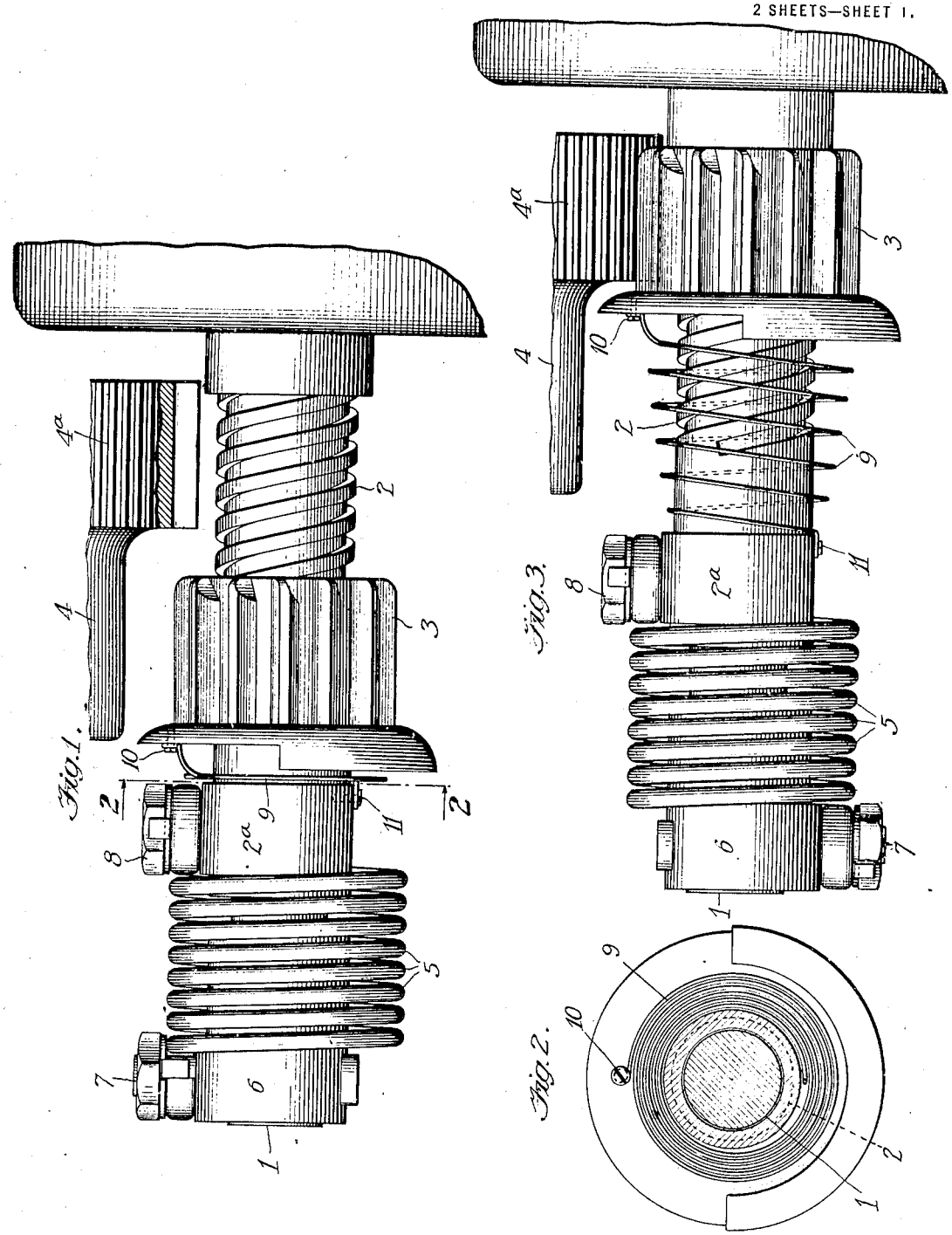

V. BENDIX.
ENGINE STARTER.
APPLICATION FILED OCT. 12, 1916.
1,308,752.
Patented July 8, 1919.
2 SHEETS—SHEET 2.
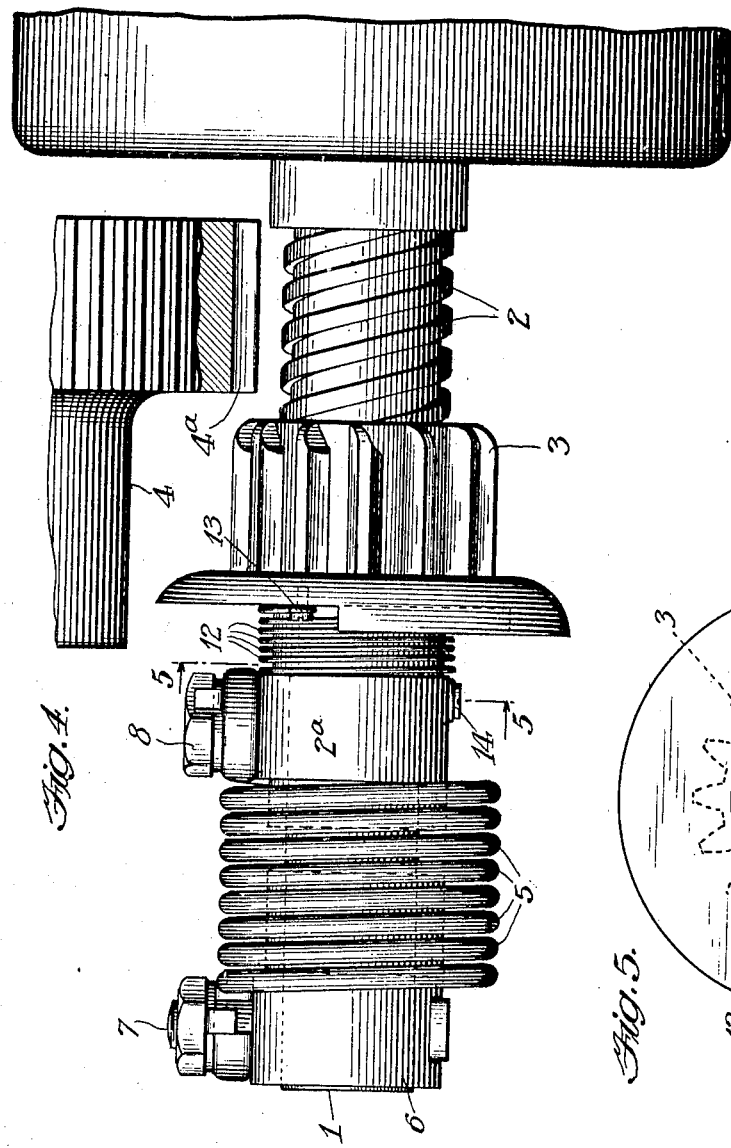
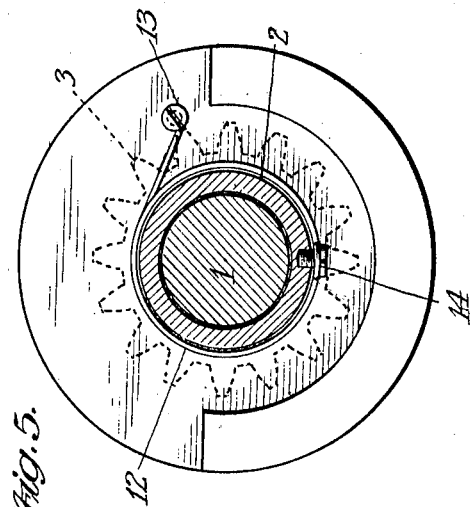

UNITED STATES PATENT OFFICE.

VINCENT BENDIX, OF CHICAGO, ILLINOIS.

ENGINE-STARTER.

1,308,752.   Specification of Letters Patent.   Patented July 8, 1919.

Application filed October 12, 1916. Serial No. 125,291.

*To all whom it may concern:*

Be it known that I, VINCENT BENDIX, a citizen of the United States, residing at Chicago, in the county of Cook and State of Illinois, have invented certain new and useful Improvements in Engine-Starters, of which the following is a specification.

My invention relates to that type of engine starter exemplified in patents heretofore issued to me, for instance Patent No. 1,125,935, dated January 26, 1915, and Patent No. 1,172,864, dated February 22, 1916, which starters are characterized by a prime mover such as an electric motor, and a transmission or drive for transmitting the power of the motor by means of a rotatable screw shaft and a pinion mounted thereon, to a member of the engine to be started, such as the fly wheel thereof. This drive comprises a screw shaft operated either directly or indirectly by the motor and the pinion screw-threaded on such shaft and having longitudinal movement thereon and rotary movement therewith.

My invention pertains to means for preventing creeping movement of the pinion on the screw shaft due to vibration of the automobile on which my engine starters are commonly employed, such means being arranged to prevent any possible slight rotation of the pinion which might advance it into contact with the fly wheel and thereby cause a clashing and a rasping sound, such means being so designed as not to interfere in any manner with the ordinary or normal operations of the drive.

In the drawings, Figure 1 is an elevation of my drive; Fig. 2 a cross section on the line 2—2 of Fig. 1 looking in the direction of the arrows; Fig. 3 a view similar to Fig. 1 but showing the pinion in meshed position and the spring extended; Fig. 4 a view similar to Fig. 1 but showing a modified form of construction; and Fig. 5 a section on the line 5—5 of Fig. 4.

The general construction of the drive is the same as shown in my patents aforesaid and therefore it will be sufficient to say that the same comprises in connection with the extended armature shaft 1, a rotatable hollow screw shaft 2, pinion 3 adapted to mesh with the teeth 4ª of the fly wheel 4, the coiled spring 5 constituting the resilient driving connection between the collar 6 secured to the armature shaft by the pin 7 and the bolt 8 which screws into the enlargement 2ª of the screw shaft.

The means provided to prevent possibility of rotary movement of the pinion 3 on the screw shaft due to vibration consists of a helical spring 9 of rather light construction and surrounding the screw shaft between the pinion 3 and the enlargement or collar formation 2ª of the screw shaft. This spring is anchored at one end to the pinion by means of the stud 10 and at the other end to the screw shaft by means of the stud 11. The tension of this spring is such as to prevent pinion movement due to vibration but not to prevent or affect in any manner the proper normal functions and operations of the pinion in its longitudinal movements with respect to the screw shaft when going into and out of mesh with the fly wheel, at which time the spring is drawn out as seen in Fig. 3. It will be understood that any movement of the pinion in either direction on the screw shaft due to vibration will be resisted by the coiled spring 9, the movement of the pinion in one direction tending to coil such spring and in the other direction to uncoil the same.

In Figs. 4 and 5, I have shown a modified form of construction with respect to the spring which is here in the form of a coiled spring 12 fastened at one end by the stud 13 to the pinion and at the other end by the stud 14 to the collar 2ª. The operation and function of this form of spring is the same as the spring 9.

I claim:

1. In a drive of the character described, the combination of a rotatable member, a driving member mounted thereon for rotary movement therewith and longitudinal movement thereof, and a yielding connection fastened to said two members respectively.

2. In a drive of the character described, the combination of a rotatable member, a driving member mounted thereon for rotary movement therewith and longitudinal movement thereof, and a spring secured to and co-operating with said two members.

3. In a drive of the character described, the combination of a rotatable member, a driving member mounted thereon for rotary movement therewith and longitudinal movement thereof, and a coiled spring around the rotatable member with one end anchored thereto and the other end to the driving member.

4. In a device of the character described, the combination of a rotatable screw-shaft, a pinion screw-threaded thereon for rotary movement therewith and longitudinal movement thereon, and a yielding connection fastened to the shaft and pinion, respectively.

5. In a device of the character described, the combination of a rotatable screw-shaft, a pinion screw-threaded thereon for rotary movement therewith and longitudinal movement thereon, and a spring fastened to the pinion and shaft respectively for preventing rotary movement of the pinion when the shaft is at rest.

6. In a device of the character described, the combination of a rotatable screw-shaft, a pinion screw-threaded thereon for rotary movement therewith and longitudinal movement thereon, and a coiled spring around the shaft with one end connected thereto and the other end to the pinion.

7. In a starting mechanism for internal combustion engines, a driving element, a driven element, means for automatically throwing said driving element into and out of driving relation with said driven element, and a spring connected with said driving element to hold said driving element in inoperative relation with said driven element when said mechanism is at rest but adapted to permit said driving element to be thrown into operative relation with said driven element when said mechanism is operated.

8. In a starting mechanism for internal combustion engines, a driving element, a driven element, a rotatable screw upon which said driving element is threaded together with means for holding said driving element from rotation thereon to cause it to be thrown into operative relation with said driven element when said screw is rotated, and yieldable means continuously acting on said driving element and tending to hold it in inoperative relation with said driven element.

9. In a starting mechanism for internal combustion engines, a driving element, a driven element, a rotatable screw upon which said driving element is threaded together with means for holding said driving element from rotation thereon to cause it to be thrown into operative relation with said driven element when said screw is rotated, and a spring connected with said driving element normally tending to hold the same in inoperative relation with said driven element when said mechanism is at rest but adapted to permit said driving element to be thrown into operative relation with said driven element when said mechanism is operated.

10. In a starting mechanism for internal combustion engines, the combination, with a starting motor shaft, of a screw loosely mounted thereon, a weighted pinion threaded on said screw, a driven gear, the arrangement and construction being such that said pinion is caused to move along said screw and become meshed with said gear when said shaft is operated, and a spring connected with said pinion tending to hold the same from movement along said screw when the same is at rest but permitting the movement of said pinion on said screw when the same is operated.

11. In a starting mechanism for internal combustion engines, the combination, with a starting motor shaft, of a screw loosely mounted on said shaft, yieldable means for forming a driving connection between said shaft and a screw, a weighted pinion threaded on said screw, a driven gear, the arrangement and construction being such that said pinion will be moved along said screw when the same is revolved by said shaft to become meshed with said gear, and a spring connected with said pinion normally tending to hold the same from travel along said screw when said mechanism is at rest but permitting the same to travel along said screw when said mechanism is operated.

VINCENT BENDIX.